United States Patent
Ju

(10) Patent No.: US 6,925,799 B2
(45) Date of Patent: Aug. 9, 2005

(54) SPEED CONTROL APPARATUS FOR HYDRAULIC ACTUATOR

(75) Inventor: Young Mo Ju, Kyungsangnam-do (KR)

(73) Assignee: Volvo Construction Equipment, Eskilstuna (SE)

(*) Notice: Subject to any disclaimer, the term of this patent is extended or adjusted under 35 U.S.C. 154(b) by 130 days.

(21) Appl. No.: 10/455,689

(22) Filed: Jun. 5, 2003

(65) Prior Publication Data

US 2004/0154295 A1 Aug. 12, 2004

(30) Foreign Application Priority Data

Feb. 12, 2003 (KR) .............................. 10-2003-0008837

(51) Int. Cl.$^7$ ............................................. F16D 31/02
(52) U.S. Cl. ........................................ 60/443; 91/506
(58) Field of Search ....................... 60/443, 487; 91/506

(56) References Cited

U.S. PATENT DOCUMENTS

| | | | | |
|---|---|---|---|---|
| 3,779,137 A | * | 12/1973 | Koivunen ..................... | 91/506 |
| 4,072,442 A | * | 2/1978 | Horiuchi ..................... | 417/218 |
| 5,085,052 A | * | 2/1992 | Kawanaka et al. ........... | 91/506 |
| 5,649,468 A | * | 7/1997 | Tsurumi et al. ............... | 91/506 |
| 5,794,515 A | * | 8/1998 | Bethke ......................... | 91/506 |
| 6,668,549 B2 | * | 12/2003 | Yano et al. .................... | 60/433 |

FOREIGN PATENT DOCUMENTS

JP       10 311424       11/1998

OTHER PUBLICATIONS

English Abstract of JP 10 311424 dated Nov. 24, 1998.

* cited by examiner

*Primary Examiner*—Edward K. Look
*Assistant Examiner*—Michael Leslie
(74) *Attorney, Agent, or Firm*—Ladas & Parry

(57) ABSTRACT

The speed control apparatus for a hydraulic actuator includes a hydraulic source, an actuator connected with the hydraulic source and driven based on a supply of an operation oil, a direction switching valve which is switchably installed in a flow path between the hydraulic source and the actuator, an inclination piston which is installed between a parallel flow path in parallel connected with a flow path in a supply side of the actuator and the actuator for thereby controlling an inclination angle of an inclination plate of the actuator, a multi-step adjusting inclination piston which is driven when an operation oil is supplied, and adjusts an inclination angle of an inclination plate of the actuator based on multiple steps, and a multi-step adjusting control valve which is switchably installed in a flow path between the parallel flow path and the multi-step adjusting inclination piston, controls an operation oil supplied to the multi-step adjusting inclination piston, and adjusts a speed of the actuator. The multi-step adjusting control valve is formed of a first zone in which the actuator is rotated at a high speed, a second zone in which the actuator is rotated at an intermediate speed, and a third zone in which the actuator is rotated at a low speed.

6 Claims, 5 Drawing Sheets

SPEED CONTROL APPARATUS FOR HYDRAULIC ACTUATOR

BACKGROUND OF THE INVENTION

1. Field of the Invention

The present invention relates to a speed control apparatus for a hydraulic actuator which is built in an actuator such as a hydraulic motor, etc. and is attached to an outer portion of the same and is capable of adjusting a speed of an actuator by multiple steps, and in particular to a speed control apparatus for a hydraulic actuator In which is capable of dividing a load applied to a hydraulic actuator and adjusting a speed of the same based on a load condition of an actuator for thereby enhancing a responsive ability.

2. Description of the Background Art

FIG. 1 is a view illustrating a conventional speed control apparatus for a hydraulic actuator, and FIG. 2 is an enlarged view of a control valve of FIG. 1.

As shown therein, a speed control apparatus for a hydraulic actuator includes a hydraulic source(not shown) such as a hydraulic pump, etc., an actuator 1 which is connected with the hydraulic source and is rotated, stopped and reverse-rotated based on a supply state of an operation oil together with a hydraulic motor, a direction changing valve 2 which is switchably installed in a flow path between the hydraulic source and the actuator 1 for controlling a flowing direction of an operation oil supplied to the actuator 1, an inclination piston 3 for controlling an inclination angle of an inclination plate of the actuator 1, and a control valve 4 which is installed in a flow path between a parallel flow path 5 and the inclination piston 3 and is switched when a pilot signal Pi is applied and controls an operation oil supplied to the inclination piston 3.

In the drawing, reference character B represents a negative type brake apparatus for implementing an elastic biasing operation based on an initial state that the rotation of the actuator 1 is stopped, and R1 and R2 represent a relief valve for draining an operation pressure when an over load occurs in the actuator 1.

The operation of the above construction will be described.

In the speed control apparatus for a hydraulic actuator, as an operation pressure discharged from the hydraulic source (not shown) such as a hydraulic pump, etc. is supplied to the actuator 1 through the direction switching valve 2, the actuator 1 is rotated in the left or right direction. At this time, since the operation oil is not supplied to the inclination piston 3 which determines a speed of the actuator 1, the actuator is rotated at a low speed.

In the case that a pilot signal pressure Pi is supplied to the control valve 4 which is installed between the direction switching valve 2 and the inclination piston 3 based on an operation of a remote control valve(RCV: not shown), as shown in FIG. 1, since the control valve 4 is switched in the left direction, the operation oil discharged from the hydraulic source is supplied to the inclination piston 3 through the control valve 4. Therefore, the actuator 1 is rotated at a high speed by controlling the inclination angle of the inclination plate of the actuator 1.

At this time, in the case that the pressure of the operation oil which rotates the actuator 1 is above a set pressure, as shown in FIG. 1, the control valve 4 is rotated in the right direction, namely, is returned to the initial position, the operation oil supplied to the inclination piston 3 is disconnected, and the actuator 1 is rotated at a low speed.

However, the above described conventional speed control apparatus for a hydraulic actuator has the following problems.

Namely, in the conventional speed control apparatus for a hydraulic actuator, the speed of the actuator is determined to a low speed or a high speed based on a state that the operation oil discharged from the hydraulic source is supplied or not supplied to the inclination piston through the control valve. Therefore, the speed of the actuator 1 is adjusted based on only the two steps of a maximum and minimum steps. In the case that the pressure of the actuator 1 is set to a low state, the efficiency of the actuator 1 is decreased, and on the contrary, in the case that the same is set to a high state, an over load occurs in the actuator at a high speed operation, so that a durability is decreased, and a left span of the product is decreased.

SUMMARY OF THE INVENTION

Accordingly, it is an object of the present invention to provide a speed control apparatus for a hydraulic actuator which is capable of improving an efficiency of an actuator by adjusting a speed based on multiple steps by dividing a set pressure of a conventional actuator which is capable of adjusting the same based on only the maximum and minimum steps and is capable of enhancing a durability by distributing an over load applied to an actuator at the time of a high speed operation.

To achieve the above objects, in a speed control apparatus for a hydraulic actuator which includes a hydraulic source, an actuator connected with the hydraulic source and driven based on a supply of an operation oil, a direction switching valve which is switchably installed in a flow path between the hydraulic source and the actuator, and an inclination piston which is installed between a parallel flow path in parallel connected with a flow path in a supply side of the actuator and the actuator for thereby controlling an inclination angle of an inclination plate of the actuator, there is provided a speed control apparatus for a hydraulic actuator which includes a multi-step adjusting inclination piston which is driven when an operation oil is supplied, and adjusts an inclination angle of an inclination plate of the actuator based on multiple steps, and a multi-step adjusting control valve which is switchably installed in a flow path between the parallel flow path and the multi-step adjusting inclination piston, controls an operation oil supplied to the multi-step adjusting inclination piston, and adjusts a speed of the actuator.

The multi-step adjusting inclination piston and the multi-step adjusting control valve are built in the actuator or are attached to an outer portion of the same.

The actuator is rotated, stopped or reverse rotated based on a supply state of an operation oil.

The multi-step adjusting control valve is formed of a first zone in which as the multi-step adjusting control valve is switched by a signal pressure which is externally supplied, an operation oil is supplied to the inclination piston, and the actuator is rotated at a high speed, a second zone in which in the case that a pressure of an operation oil supplied to the actuator exceeds a first set pressure, an operation oil is concurrently supplied to the inclination piston and the multi-step adjusting inclination piston, and the actuator is rotated at an intermediate speed, and a third zone in which in the case that a pressure of an operation oil supplied to the actuator exceeds a second set pressure, an operation oil is drained from the inclination piston, and the actuator is rotated at a low speed.

An orifice is installed in a flow path between the multi-step adjusting control valve and the multi-step adjusting inclination piston and a flow path between the multi-step adjusting control valve and the inclination piston, respectively.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The construction of a speed control apparatus for a hydraulic actuator according to a preferred embodiment of the present invention will be described with reference to the accompanying drawings.

Figure 1:
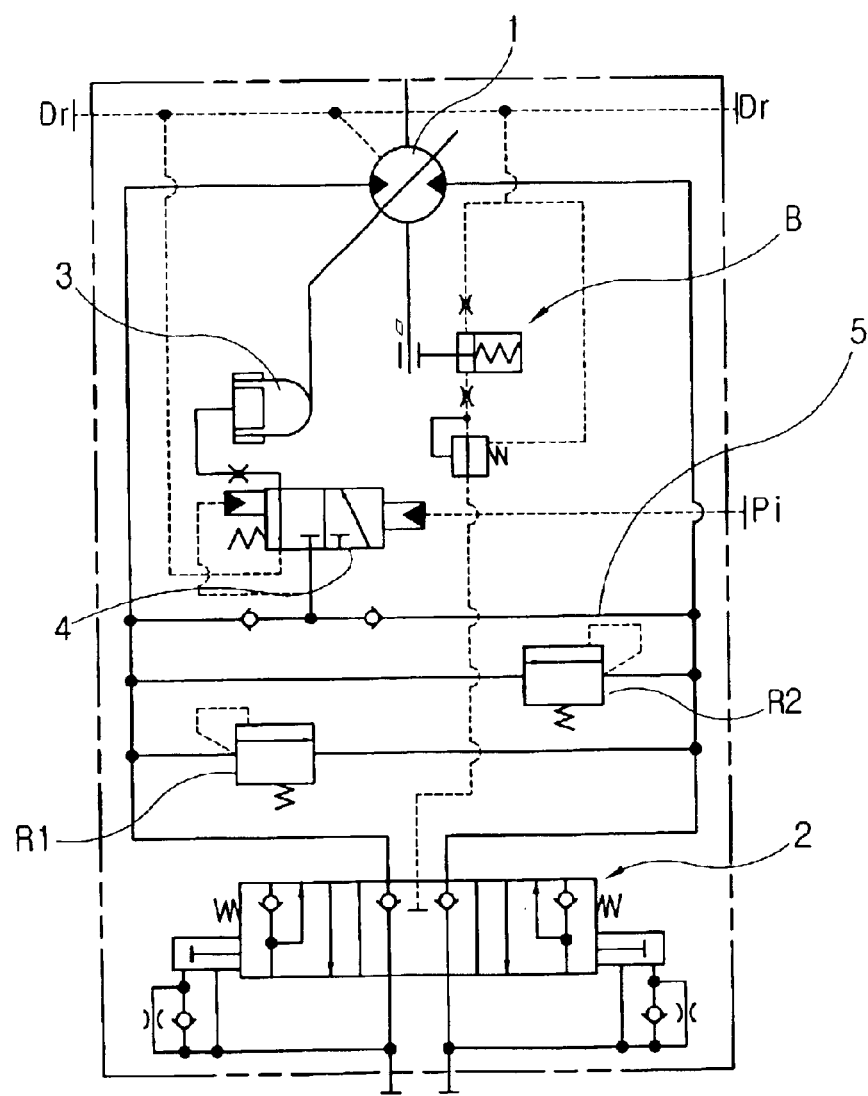
FIG. 1 is a view illustrating a conventional speed control apparatus for a hydraulic actuator.
Figure 2:
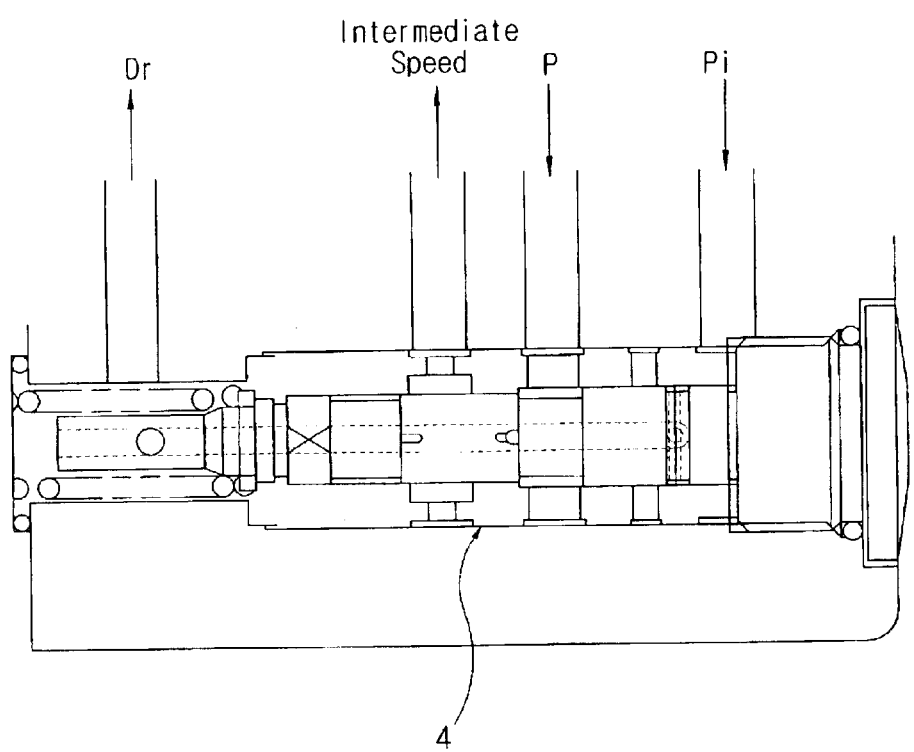
FIG. 2 is an enlarged view of a control valve of FIG. 1.
Figure 3:
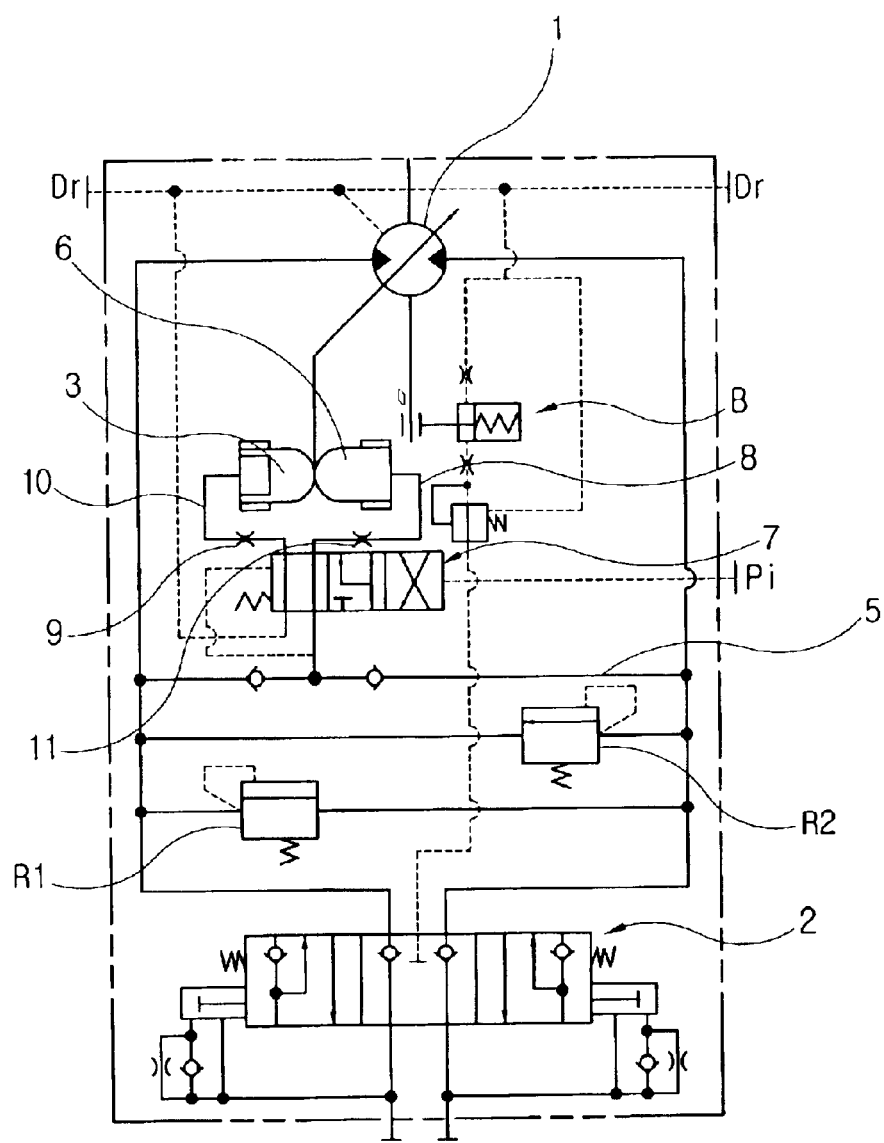
FIG. 3 is a view illustrating a speed control apparatus for a hydraulic actuator according to the present invention.
Figure 4:
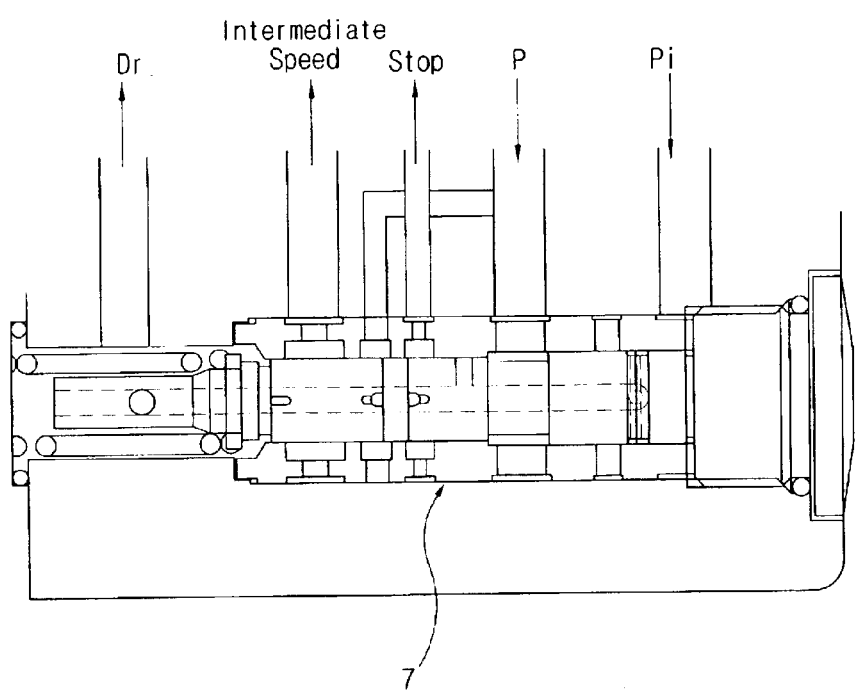
FIG. 4 is an enlarged view illustrating a multi-step adjusting control valve of FIG. 3 according to the present invention.
Figure 5:
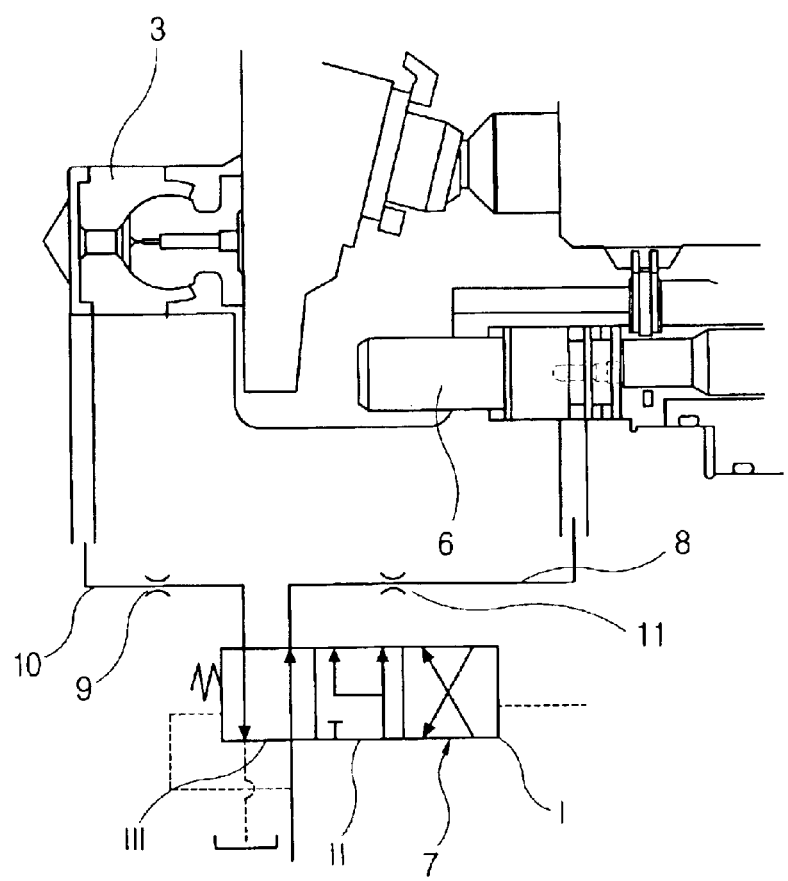
FIG. 5 is a view illustrating a major element in the construction f a speed control apparatus for a hydraulic actuator according to the present invention.

FIG. 3 is a view illustrating a speed control apparatus for a hydraulic actuator according to the present invention, FIG. 4 is an enlarged view illustrating a multi-step adjusting control valve of FIG. 3 according to the present invention, and FIG. 5 is a view illustrating a major element in the construction f a speed control apparatus for a hydraulic actuator according to the present invention.

For a simplification of the description, the same elements as the conventional art will be given the same reference numerals.

As shown in the drawings, a speed control apparatus for a hydraulic actuator according to the present invention includes a hydraulic source(not shown) such as a hydraulic pump, etc., an actuator 1 which is connected with the hydraulic source and is rotated, stopped or reverse-rotated based on a supply of an operation oil like a hydraulic pump, etc., a direction switching valve 2 which is switchably installed in a flow path between the hydraulic source and the actuator 1 and controls a flow direction of the operation oil supplied to the actuator 1, an inclination piston 3 which is installed between a parallel flow path 5 in parallel connected with a flow path of a supply side of the actuator and the actuator 1 for thereby controlling an inclination angle of an inclination plate of the actuator 1, a multi-step adjusting inclination piston 6 which is built in the actuator 1 or is attached to an outer portion of the same and is driven when an operation oil is supplied, for thereby adjusting an inclination angle of an inclination plate of the actuator 1 based on the multiple steps, and a multi-step adjusting control valve 7 which is switchably installed between the parallel flow path 5 and the multi-step adjusting inclination piston 6 and controls the operation oil supplied to the multi-step adjusting inclination piston 6 based on a switching operation, for thereby adjusting the speed of the actuator 1 based on the multiple steps.

At this time, the multi-step adjusting control valve 7 is formed of a first zone I in which the actuator 1 is rotated at a high speed as the multi-step adjusting control valve 7 is switched by an externally supplied signal pressure Pi, and an operation oil is supplied to the inclination piston, a second zone II in which the actuator 1 is rotated at an intermediate speed by concurrently supplying the operation oil to the inclination piston 3 and the multi-step adjusting inclination piston 6 when a pressure of the operation oil supplied to the actuator 1 exceeds a first set pressure, and a third zone III which the actuator 1 is rotated at a low speed by draining the operation oil from the inclination piston 3 when a pressure of the operation oil supplied to the actuator 1 exceeds a second set pressure.

Orifices 9 and 11 are installed in a flow path 10 between the multi-step adjusting control valve 7 and the inclination piston 3 and in a flow path 8 between the multi-step adjusting control valve 7 and the multi-step inclination piston 6 for thereby preventing a quick driving operation of the pistons 3 and 6.

The operation of the speed control apparatus for a hydraulic actuator according to the present invention will be described with reference to the accompanying drawings.

As shown in FIGS. 3 through 5, as the operation oil discharged from the hydraulic source(not shown) such as a hydraulic pump, etc. is supplied to the actuator 1 through the direction switching valve 2, the actuator 1 is rotated in the left or right direction. At this time, since the operation oil is not supplied to the inclination piston 3 which determines the speed of the actuator 1, the actuator 1 is rotated at a low speed.

As a pilot signal pressure Pi is supplied to the right side of the multi-step adjusting control valve 7 based on an operation of the remote control valve(RCV: not shown), as shown in FIG. 3, in the case that the multi-step adjusting control valve 7 is switched in the left direction(the third zone III of the multi-step adjusting control valve 7), the operation pilot from the direction switching valve 2 is supplied to the inclination piston 3 through the third zone III of the multi-step adjusting control valve 7, so that as the inclination angle of the inclination plate of the actuator 1 is controlled, the actuator 1 is rotated at a high speed. At this time, the operation oil in the interior of the multi-step adjusting piston 6 is drained into a hydraulic tank through the flow path 8.

In addition, in the case that the pressure of the operation oil supplied when the actuator 1 is rotated at a high speed exceeds the first set pressure, the multi-step adjusting control valve 7 is switched to the second zone II which is an intermediate position, and the operation oil from the direction switching valve 2 is concurrently supplied to the inclination piston 3 and the multi-step adjusting piston 6 through the second zone II of the multi-step adjusting control valve 7, so that the actuator is rotated at an intermediate speed.

In the case that the pressure of the operation oil supplied to the actuator 1 exceeds the second set pressure, as shown in FIG. 3, the multi-step adjusting control valve 7 is switched to the first zone I, and the operation oil from the direction switching valve 2 is supplied to the multi-step adjusting piston 6 through the first zone I of the multi-step adjusting control valve 7, so that the actuator 1 is rotated at a low speed. At this time, the operation in the interior of the inclination piston 3 is drained to the hydraulic tank through the flow path 10.

As described above, in the present invention, as the set pressure of the hydraulic actuator 1 is divided into the multi-steps(for example, the high speed, intermediate speed, and low speed), it is possible to effectively distribute the over load applied to the actuator 1 for thereby enhancing a durability. In addition, it is possible to maximize the efficiency by dividing the speed of the actuator 1.

As the present invention may be embodied in several forms without to departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a speed control apparatus for a hydraulic actuator which includes a hydraulic source, the actuator connected with the hydraulic source and driven based on a supply of an operation oil, a direction switching valve which is switchably installed in a flow path between the hydraulic source and the actuator, and an inclination piston which is installed between a parallel flow path in parallel connected with a flow path in a supply side of the actuator and the actuator for thereby controlling an inclination angle of an inclination plate of the actuator, the speed control apparatus for the hydraulic actuator, comprising:

a multi-step adjusting inclination piston which is driven when an operation oil is supplied, and adjusts the inclination angle of the inclination plate of the actuator based on multiple steps; and a multi-step adjusting control valve which is switchably installed in a flow path between the parallel flow path and the multi-step adjusting inclination piston, controls an operation oil supplied to the multi-step adjusting inclination piston, and adjusts a speed of the actuator, wherein said multi-step adjusting control valve is formed of:

a first zone in which as the multi-step adjusting control valve is switched by a signal pressure which is externally supplied, an operation oil is supplied to the inclination piston, and the actuator is rotated at a high speed;

a second zone in which in the case that a pressure of an operation oil supplied to the actuator exceeds a first set pressure, an operation oil is concurrently supplied to the inclination piston and the multi-step adjusting inclination piston, and the actuator is rotated at an intermediate speed; and a third zone in which in the case that a pressure of an operation oil supplied to the actuator exceeds a second set pressure, an operation oil is drained from the inclination piston, and the actuator is rotated at a low speed.

2. The apparatus of claim 1, wherein an orifice is installed in a flow path between the multi-step adjusting control valve and the multi-step adjusting inclination piston and a flow path between the multi-step adjusting control valve and the inclination piston, respectively.

3. The apparatus of claim 1, wherein said multi-step adjusting inclination piston and said multi-step adjusting control valve are built in the actuator or are attached to an outer portion of the same.

4. The apparatus of claim 3, wherein an orifice is installed in a flow path between the multi-step adjusting control valve and the multi-step adjusting inclination piston and a flow path between the multi-step adjusting control valve and the inclination piston, respectively.

5. The apparatus of claim 1, wherein said actuator is rotated, stopped or reverse rotated based on a supply state of an operation oil.

6. The apparatus of claim 5, wherein an orifice is installed in a flow path between the multi-step adjusting control valve and the multi-step adjusting inclination piston and a flow path between the multi-step adjusting control valve and the inclination piston, respectively.

* * * * *